INVENTOR.
Byron C. Thomson

Sept. 3, 1963  B. C. THOMSON  3,102,349
PROCESS AND MACHINE FOR FORMING AND CLEANING QUARTER
DRAINS IN SUGAR CANE GROWING SQUARES
Filed Nov. 9, 1961  7 Sheets-Sheet 2
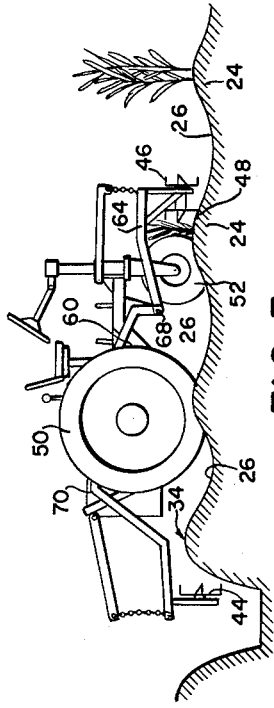
FIG. 3.
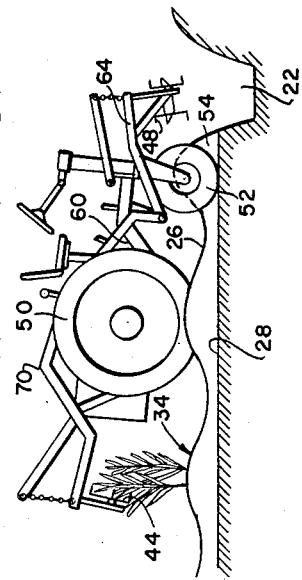
FIG. 5.
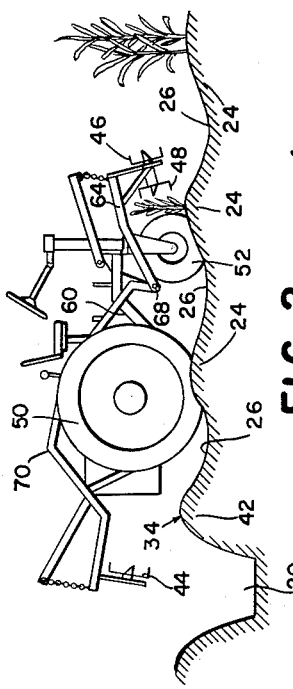
FIG. 2.
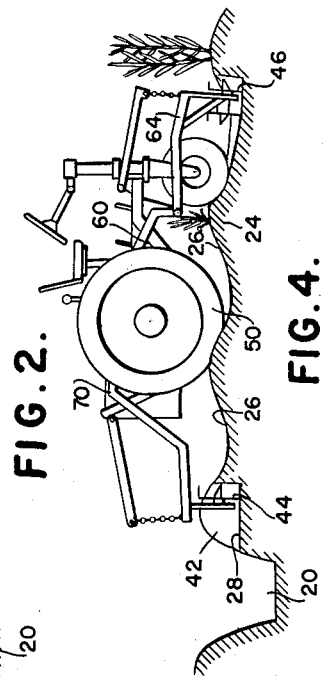
FIG. 4.
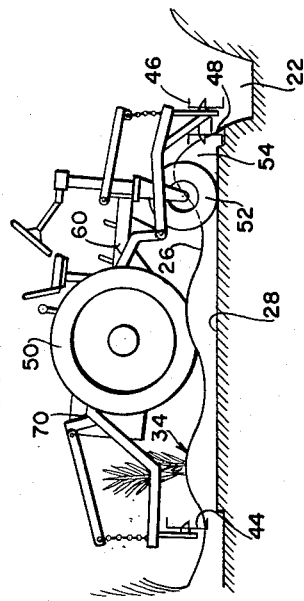
FIG. 6.
FIG. 7.
*INVENTOR*
Byron C. Thomson
BY
Wilkinson, Mawhinney & Theibault
*ATTORNEYS*

INVENTOR.
Byron C. Thomson

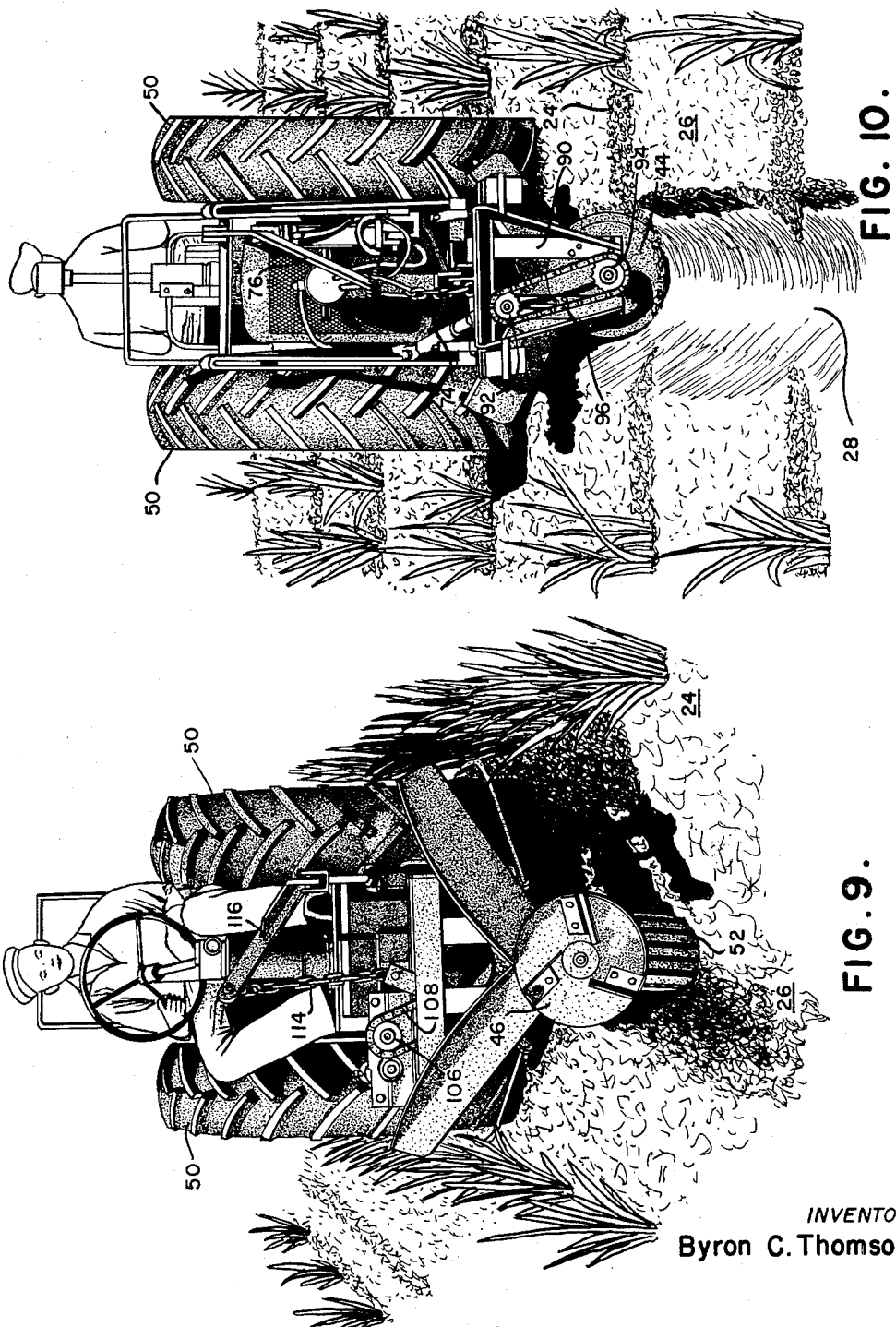

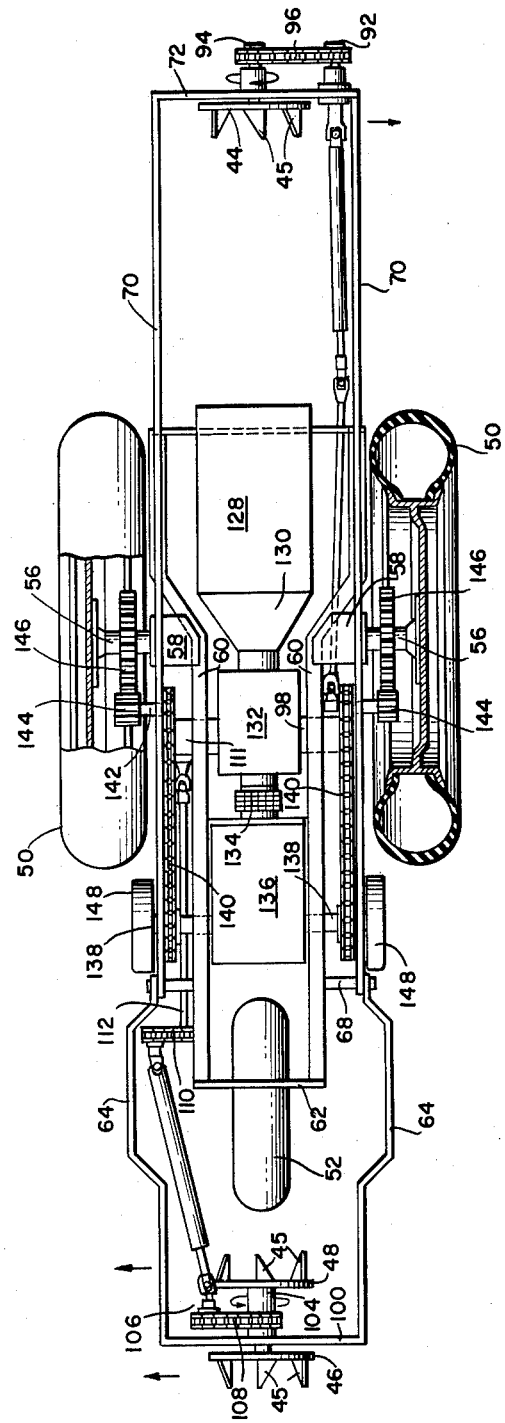

INVENTOR
Byron C. Thomson

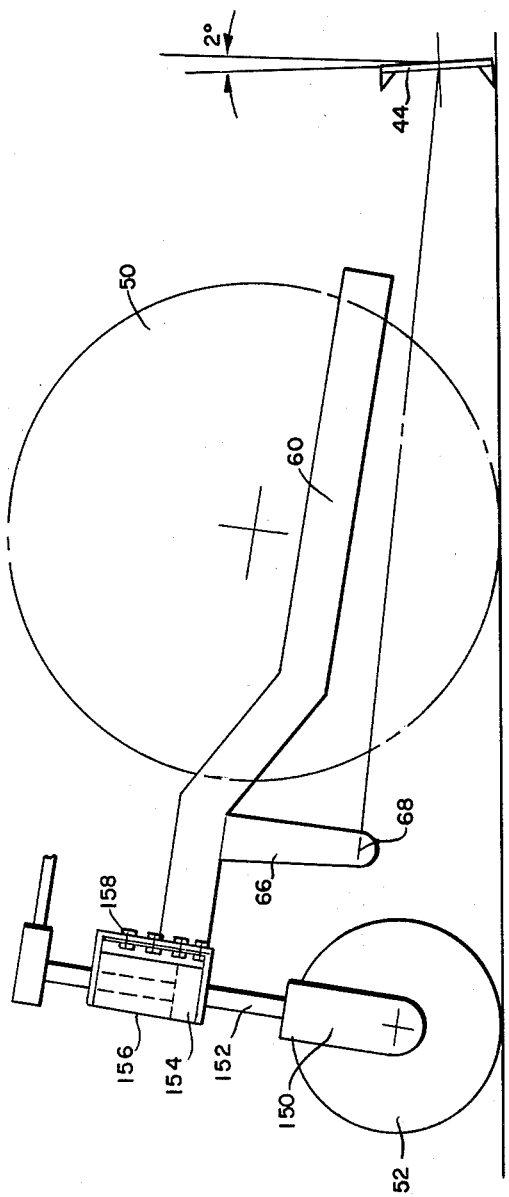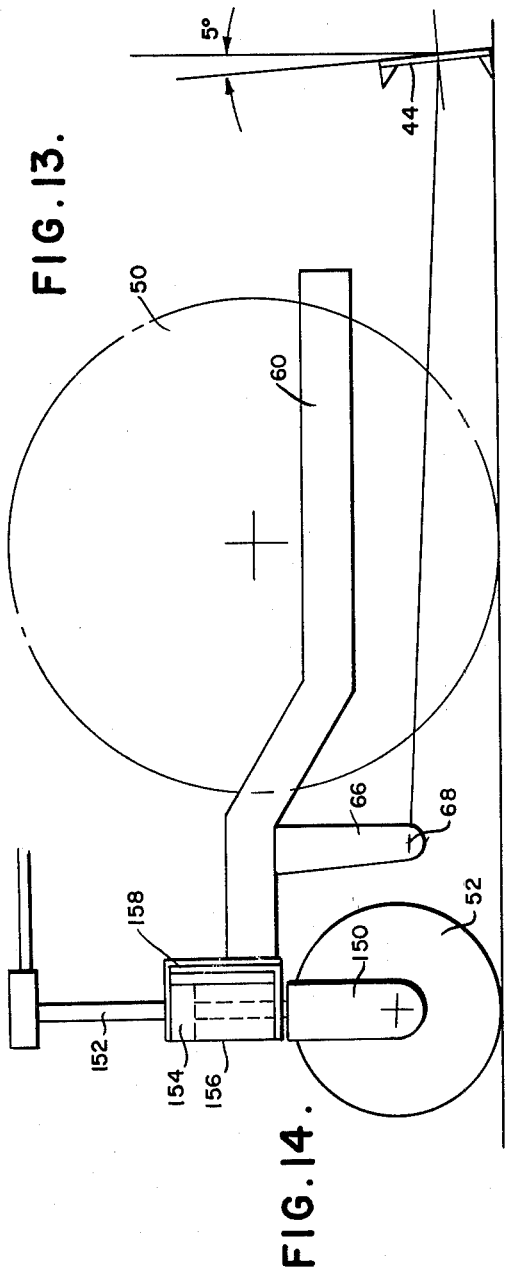

United States Patent Office 3,102,349
Patented Sept. 3, 1963

3,102,349
PROCESS AND MACHINE FOR FORMING AND CLEANING QUARTER DRAINS IN SUGAR CANE GROWING SQUARES
Byron C. Thomson, Thibodaux, La., assignor to Lamb Industries, Inc., Toledo, Ohio, a corporation of Delaware
Filed Nov. 9, 1961, Ser. No. 151,334
11 Claims. (Cl. 37—195)

The present invention relates to process and machine for forming and cleaning quarter drains in sugar cane growing squares.

In Louisiana cane fields are layed out in squares of approximately 200 feet wide by 400 feet deep containing approximately two to three acres. On the sides of a square are drainage ditches which run parallel with the cane rows. The cane is planted in hills with middles therebetween.

Crosswise of the square and of the rows of cane are so-called quarter drains. These quarter drains are narrow depressions extending across the square of cane about the same depth as the cane middles. The quarter drains take the water after rain from the low middles between the cane rows across the square into the drainage ditches.

It is necessary to open these drains after every field plowing or cultivation of the growing crop so that the land can properly drain. Thus each drain must be opened or re-formed eight to ten times a year.

Originally the digging and re-opening of quarter drains was accomplished with a mule and plow in which the plow followed the mule. As the mule could not enter the far ditch this plowing operation could be completed only at a distance from the far ditch leaving a certain end strip of drain that had to be opened by men with shovels to complete the job of running the drain through and into the far ditch so that the water will flow freely.

Also, where the drain is opened by mule and plow practically all middles are stopped up where they enter the drain by the furrow which has been turned by the plow, thereby throwing earth into each middle where it enters the drain. This fact necessitates quite a lot of manual work to open each middle in additon to completing the drain near the far ditch. The scattering action of the present invention avoids stopping up the middles.

Some years ago a certain Herbert Barras devised a machine for performing and cleaning these quarter drains semimechanically upon which he secured Patent 2,615,-263, granted October 28, 1952. However, this machine is pulled by a mule and followed by a man so that the Barras machine merely takes the place of a plow. However, it does an excellent job of throwing the dirt out of the drain. Under the present system of mechanization in Louisiana it is difficult to find anyone now who knows how to handle a mule in this kind of work and as aforesaid there is a substantial portion of the drain left unfinished (where the mule stands) leading into the second or far lateral ditch, which has to be cleaned by hand labor. This methtod is not satisfactory at this time.

Some recent attempts have been made to use small tractors, some with wheels and some with crawler tracks to pull the Barras drain cleaner behind them, but when the tractor approaches the far ditches across the square of cane there is the unfinished distance occupied by the tractor between the ditch and the trailing cleaner (as with the mule) which must be dug out and cleaned manually. This is not completely satisfactory.

The difficulty in using wheel type tractors of more or less standard width is the fact that one wheel is in the drain and the other wheel is extending out four, five or six feet as the case may be into the cane which obviously breaks much cane and is very difficult to turn at the ditch without breaking considerably more cane. When a narrow crawler tractor is used it may be narrow enough to follow in the space allowed for the quarter drain, but it has been found that when this type of tractor crosses the small ditches it has a tendency to fill up the ditch as it loosens the dirt at its edge, which dirt falls into the ditch so that after one or two crossings the ditch itself has been stopped up. This necessitates expensive ditch cleaning.

Crawler tractors are supposed to cross narrow ditches, thereby cleaning the drain continuously from one lateral ditch into the other. However, the crossing of even these small ditches with a crawler trailer is not satisfactory and when the ditch happens to be larger than usual the crossing is impossible. For this and other reasons the crawler type of small tractor has not been satisfactory.

The primary object of the invention is to overcome the above-described problems with prior and existing devices and to provide a process and a machine for originally digging or, afterwards cleaning, quarter drains which will dispense with hand labor completely and achieve the forming or cleaning in a single operation from the near to and through the far ditch in a completely automatic manner and in the case of a machine with one pass of the machine across the square.

It is another object of the invention to provide a novel process and a novel machine for carrying out the process in a highly efficient manner without doing damage to the young or mature plants and in the case of the machine, in which the latter can be accommodated between cane rows and between plants crosswise of cane rows in the narrow area allowed for quarter drains, without injurious contact therewith and which machine can be manipulated to make short turns into the quarter drains from a middle.

The process may be carried out by other forms of machine than that herein illustrated, but such form has been found to be satisfactory for the purpose.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a plan view of a cane growing square illustrating the progress of the novel process and the path of a form of machine for achieving the objects of the inventions.

FIGURES 2–7 inclusive are diagrammatic views showing steps of the process as practiced by a form of machine developed to carry out such steps.

FIGURE 8 is a perspective view of a preferred form of machine pursuant to the mechanical invention involved illustrated in a cane field in an origin position with the after cleaner member or cutter lowered into the near ditch, the wheeled frame or machine pointed toward the far ditch in the line of a quarter drain and with the forwardly cutting fore cutter or cleaning member spaced from the near ditch and in front of the machine so as to cut through the far ditch when the machine arrives at the final position of its pass crosswise of the growing cane rows.

FIGURE 9 is a front elevational view of the machine moving between adjacent rows of cane with the front ground steering wheel traveling in a middle or trough between adjacent hills while the front cutter is raised.

FIGURE 10 is a rear elevational view of the machine moving crosswise of the rows from one lateral ditch to the other and illustrating the rear cutter or cleaner member in a quarter drain in the act of forming or cleaning the same.

FIGURE 11 is a top plan view of a form of machine according to the invention with parts broken away and parts shown in section.

FIGURES 13 and 14 are diagrams of the main frame in two positions relative to the front ground steering wheel and angularly about the axis center of the rear bull wheels resulting in angular adjustments of fore and aft pitch of the rear cleaner member or cutter.

Figure 1:
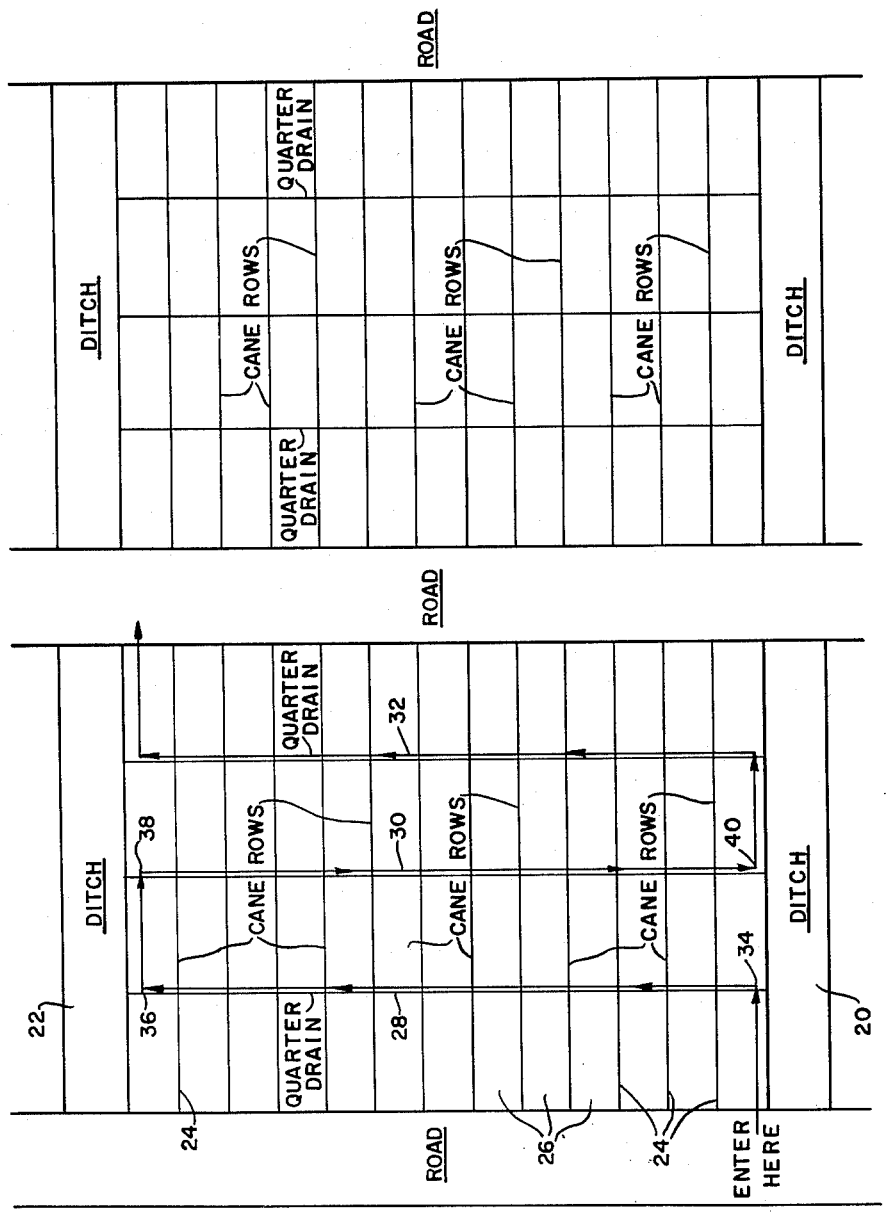

Referring more particularly to the drawings and for the present to FIGURE 1, this figure illustrates in plan the general layout of a cane growing square showing at opposite sides thereof the draining ditches 20 and 22 which run parallel with the rows of the growing cane indicated at 24. These plants are spaced apart longitudinally along the rows or hills 24. Between the hills are the middles or troughs 26.

The quarter drains are indicated at 28, 30 and 32 and they run crosswise of the rows 24 from ditch 20 to ditch 22.

The progress of the method is shown by the arrows in this FIGURE 1. These arrows also indicate the path of the machine for carrying out the method. This machine is introduced from the road at one end into the square, for example, at the point marked "Enter Here." The machine is driven along initially parallel to the cane rows and between the first adjacent cane row and the ditch 20 until the turning point 34 is reached at which a quarter drain 28 is to be cut or cleaned. The machine must be turned at the point 34 so that it faces in the line of the drain 28 whereupon, after suitable adjustments of its cleaning members or cutters, the machine is directed along the line of the drain 28 in the direction of the arrows until it reaches a final position at the near bank of the opposite ditch 22 whereupon at the point 36 the machine is turned again at approximately right angles along the ditch 22 and between that ditch and the first adjacent row 24 of cane to the point 38 where the second quarter drain is to be dug or cleaned.

At this point the machine is again turned to the right at right angles so that it again faces crosswise of the rows. On suitable adjustment of the cutters or cleaning members the machine then progresses in the direction of the arrows along the drain line to the origin ditch 20. At the turning point 40 the drain 30 is completed and the machine turned to the left along the ditch 20 where it is driven to the starting point of the next drainage ditch 32 and the cycle is thereupon repeated throughout the cane field.

Now referring to FIGURES 2 to 7 inclusive, a form of machine for carrying out the process or method is illustrated in diagram and in FIGURE 2 this machine is in an origin position having just made the turn at the point 34 so that the machine is oriented toward the far ditch 22. In the formation of the near ditch 20, earth thrown up therefrom accumulates upon its banks, the bank which is included in the square being indicated at 42. The machine is equipped with cleaning members or cutters, which for example may follow the pattern of the cutter disclosed in the Barras patent aforesaid. These members will for convenience hereinafter be referred to as cutters. They are at least two, and preferably three in number, including an after cutter 44, a fore cutter 46 and a reverse cutter 48.

The after cutter 44 extends at least rearwardly of the rear wheels 50 and the fore cutter 46 and the reverse cutter 48 both extend at least forwardly of the front wheel 52. The after cutter 44 and the fore cutter 46 are constructed and arranged to cut forwardly, that is, during the forward motion of the machine; while the reverse cutter 48 is faced backwardly and is constructed and arranged to cut only in a rearward motion of the machine.

As will be later explained in a more specific description of a particular form of machine, means are provided on the machine for raising and lowering these various cutter assemblies, and it will be understood that in entering a square the cutters will be in the raised position shown in FIGURE 2. This FIGURE 2 is the origin position, as heretofore noted, and after the machine has been turned at the point 34 completely shows that its front portion faces the far ditch 22 and the longitudinal center of the machine is alined with the proposed line of the quarter drain, the after cutter 44 being in a position above the near ditch 20.

FIGURE 3 shows the next step of the process or method in which all the cutters have been lowered and adjusted to positions to initiate the cutting operations. For instance the rear cutter 44 may be initially lowered to drain depth line while the fore cutter 46 is adjusted to dig down to this line as shown in FIGURE 4 in which an initial cut has been made by the after cutter 44 through the ditch bank 42 and the fore cutter 46 has inclined down substantially to a drain depth line.

FIGURE 5 shows both fore and after cutters 46 and 44 as travelling at an intermediate portion of the drain both at drain depth level.

FIGURE 6 shows the arrival of the fore cutter 46 over the far ditch 22 showing completion of the cutting or cleaning of the quarter drain 28 in one pass of the machine laterally of the square. In this position of FIGURE 6, the after cutter 44 has completed its cutting operation as initially established in FIGURE 3. In other words, from the point in FIGURE 6 occupied by the after cutter 44 to and through the ditch bank 54, the after cutter 44 is ineffective and this cutting operation is performed only and solely by the fore cutter 46.

Reversing to FIGURE 4, it will be seen that this after cutter 44 performs alone the cutting or cleaning of the drain from the near ditch 20 up to the origin point occupied by the fore cutter 46.

Thus the two forwardly cutting fore and after cutters 46 and 44 mutally contribute to the complete cleaning of the drain from ditch to ditch in one pass of the machine. Both fore and after cutters, following one another, contribute to the cutting of the drain between the origin point of the fore cutter 46 and the final position of the after cutter 44 as substantially shown in FIGURE 6. In effect the fore device is made double so that it will operate either going forward or backing up. This fact is especially advantageous because, in many cases, the quarter drain must be deeper at the ditch because of earth which has been deposited on the bank 54 when the ditch was dug out. By cleaning the drain going toward the ditch, considerable earth is shoved into the ditch in order to cut the drain deep enough. Also it may be desirable to lift or use lightly the fore drain cleaner as it nears the ditch. Then when it arrives over the ditch, the front assembly may be lowered to the proper drain level and the machine then back up in which event the reverse cutter 48 will cut the drain at the proper depth with no earth deposited in the ditch. Furthermore, if the drain adjacent to the ditch 22 is not deep enough, it may be deepened by the reverse cutter 48 in the act of backing up the machine a short distance in turning around to proceed to the next drain. When the drain is completely cut or cleaned the cutters are raised, as shown in FIGURE 7, and the machine turned along the bank 54 to the next drain where similar operations are repeated.

Figure 12:
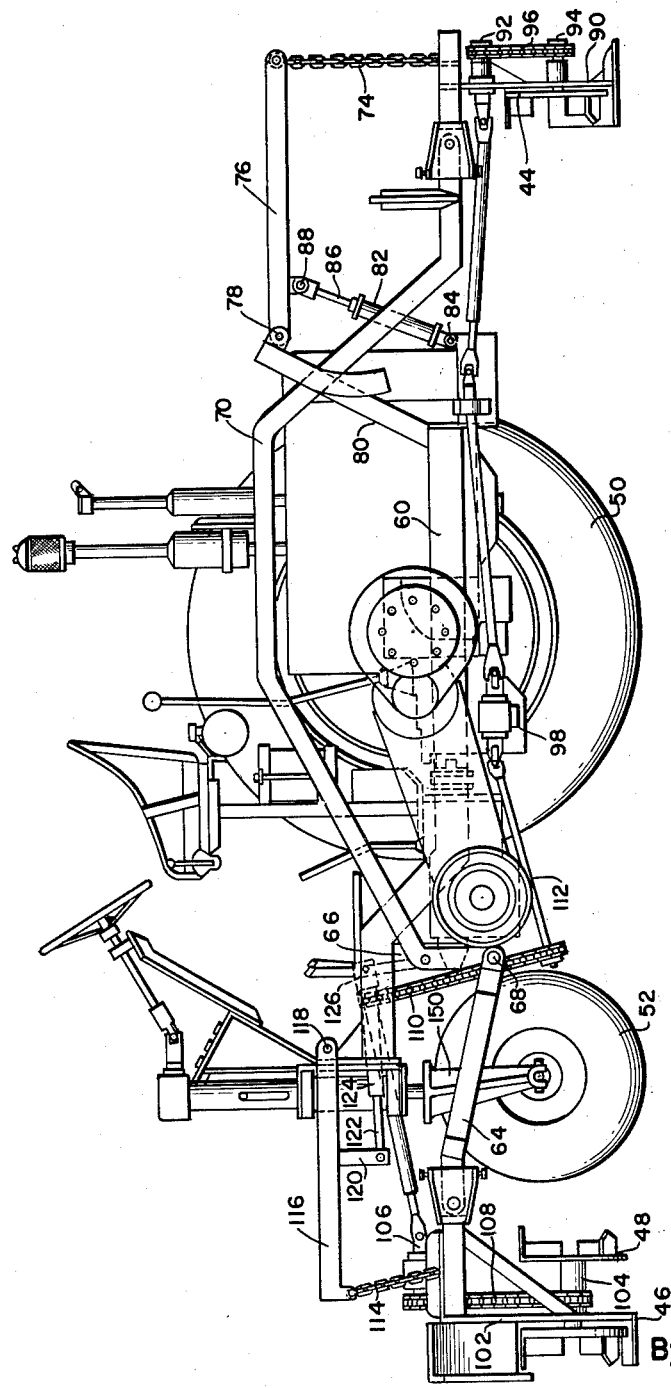
FIGURE 12 is a side elevational view of the machine of FIGURE 11 with the near bull or propulsion wheel removed.

Referring more particularly to FIGURES 11 and 12, the wheels 50, which constitute the main support of the machine and are preferably also the propulsion wheels, are affixed to stub axles 56 which are driven independently of one another. The bearing members 58 for the stub axles 56 are also rotatable relatively to the axles 56 and are affixed to the side members 60 of a main frame which is suitably cross braced, the front bracing being by the front cross member 62 which derives its support from the front ground steering wheel 52 as hereinafter described.

The fore cutter assembly frame consists principally of the side bars 64, the rear ends of which are pivoted in hanger brackets 66 which depend from forward portions of the main frame side bars 60 by the use of a cross pivot pin 68.

Similarly the side bars 70 of the after cutter assembly frame are pivoted at their forward ends upon this same pivot pin 68, the side bars 70 being offset upwardly, as indicated in FIGURE 12, to clear essential equipment on the machine. A rear cross bar 72 connects the side bars 70 and to which is attached a chain or flexible connection 74 having connection also to the rear end of an arm 76 pivoted at 78 upon a pivot which is carried by a bracket 80 affixed to the main frame.

A hydraulic cylinder 82 is pivoted to the main frame at 84 and its plunger rod 86 is connected by pivot 88 to the arm 76 whereby the arm 76 and through the chain the rear cutter assembly frame 70 may be raised and lowered and adjusted as to depth.

A dependent hanger 90 on the rear cutter assembly frame 70 carries a drive shaft 92 and a cutter shaft 94 on which the cutter 44 is fixedly mounted. A chain and sprocket connection 96 between the two shafts serves to drive the after cutter 44. The drive shaft 92 may be in a suitable number of sections universally coupled together and to a power take-off 98 from a transmission as hereinafter described.

The side bars 64 of the front cutter asssembly are connected as by a front cross bar 100 from which depends a hanger 102 in which is journalled a shaft 104 carrying the cutter members 46 and 48. The front assembly frame also carries a drive shaft 106. Between the shafts 104 and 106 are suitable transmission connections, for instance, a chain 108 and sprockets. The drive shaft 106 connects with a chain and sprocket connection 110 to a shaft section 112 which is also driven from the transmission, being arranged at the opposite side of the main frame by a power take-off connection 111.

The forward cutter assembly frame 64 is raised and lowered about its pivot connection 68 by hydraulic power or otherwise which involves a chain 114 connecting the forward assembly frame to an arm 116 pivoted at 118 on the main frame and having a dependent lug 120 pivotally connected with a piston 122 of a hydraulic cylinder 124 pivoted at 126 upon a main frame part.

The machine may be driven from an engine or suitable power unit 128 connected by a clutch 130 to a first transmission 132 and from such first transmission to a chain coupling 134 to a combined second transmission and differential assembly 136 which drives independently differential shaft sections 138. Independent chain and sprocket connections 140 connect the shaft sections 138 to pinion shafts 142 to which are affixed pinions 144 meshing with gear wheels 146 affixed to the axles 56. The engine and connections to drive the wheels 50 are mounted upon the main frame.

Independent brakes 148 are mounted to each of the differential shaft sections 138 whereby either wheel 50 may be arrested in motion while the other is continually driven either in a forward or reverse direction for effecting turning movements of the machine.

Referring more particularly to FIGURES 12, 13 and 14, 150 designates the front wheel fork and 152 the fork post upon which there is mounted a piston 154. The piston is affixed to the post and over the piston is mounted a movable cylinder 156 connected by a suitable adapter 158 to the front portion of the main frame 60. The cylinder 156 is also a hydraulic cylinder constituting with the piston a hydraulic motor for raising and lowering the front portion of the main frame 60, as shown in FIGURE 13. When the front portion of the main frame is elevated the main frame rotates about an axis coincident with the stub axles of the main wheels 50. In going through this angular movement the pivot point 68 for both front and rear cutter assembly frames is elevated. The front portion of the main frame is raised, as in FIGURE 13, or lowered as in FIGURE 14, accordingly as the steering and leveling cylinder 156 is moved up or down. Such movement in turn raises and lowers the rear cutter 44 but not in a definite perpendicular path. As a matter of fact the rear cutter, incident to this operation, travels up and down in an arc about the pivot point 68. Because of the distance between the rear cutter blade 44 and the pivot point 68, a two inch movement of the cylinder changes the pitch of the rear cutter 44 approximately one degree. Consequently, such arrangement allows adjustment of pitch by the operator at any time without being too abrupt while selecting a proper working angle of the cutter to suit soil conditions.

By attaching the rear after cutter 44 to the frame by the pivot 68, the rear wheels may travel up and down over the cane rows allowing the hinge pivot point 68 to travel in a relatively horizontal plane.

The front cutter assembly frame 64 also hinges or pivots from the same point 68 but differs in action from the rear assembly because the front assembly is always suspended by the front lift device; whereas the rear cutter is free floating.

It will be appreciated that a machine travelling crosswise of a square encounters some rough going in that the wheels 50 and 52 must ride up laterally over the hills and down and through the middles, which motion alternately lifts and lowers the main frame 60 at its rear portion. However, due to the pivotal mounting of this main frame 60 about the transverse axis passing through the stub axles, the bracket 66 at the front part of the main frame and particularly its pivotal mounting 68 for the front and rear cutter assemblies 64, 70 will not participate in this movement. The pivot point 68 will not be materially shifted and consequently the relationship of the fore and aft cutters will not be materially disturbed in their relationship to the ground and drain being cut or cleaned.

On the other hand, the movement of the steering and leveling cylinder 156, as shown in FIGURES 13 and 14, will elevate and lower the front portion of the main frame 60 thus also rocking it about its stub axles in a vertical sense which does produce raising and lowering of the pivot point 68, thereby affecting the pitch of the rear cutting device 44 which in turn promotes a more effective cleaning out of quarter drains under varying conditions.

An important point also is the front and rear digging simultaneously without which it is impracticable to cut a drain continuously from one lateral ditch into another, thereby eliminating all subsequent hand work.

The construction and relationship of the parts enables a very short wheel base, that is the distance between the axles of the ground propulsion wheels 50 and the axis of the front wheel 52, such distance being of the order of sixty inches by which very short wheel base the machine is enabled to turn at right angles at the various turning points and proceed from quarter drain to quarter drain without the wheels passing over the plants and damaging the crop. This feature is also materially aided by the separately driven stub shafts for the wheels 50 and the individual brakes for the individual gear trains which enables one wheel 50 to be completely arrested in motion while the other wheel is continuously driven. Under these circumstances the braked wheel constitutes a fulcrum about which the short machine may be turned within the confines of the width permitted between cane rows and between the plants of the rows.

A machine, constructed and arranged as illustrated and described, also lends itself to a very narrow tread, for instance of the order of thirty-seven inches which is ample to allow the machine including the wheels 50 to travel well within the confines between two adjacent rows of cane.

In this connection FIGURE 9 shows the machine moving between adjacent rows of the cane plants with the main propulsion wheels 50 well within the space between the hills, thus avoiding rolling over the plants. In this instance the front wheel 52 is travelling substantially at the base of the middle.

FIGURE 10 shows the machine moving crosswise of the rows in the direction of the drain 28 and here again the narrow tread enables the machine to move between the plants without injury to the same. When the machine has finished one drain, in order to proceed to the next drain, it must pass longitudinally of the rows either between two rows or between an end row and a ditch bank. These positions define narrow confines.

Figure 8:
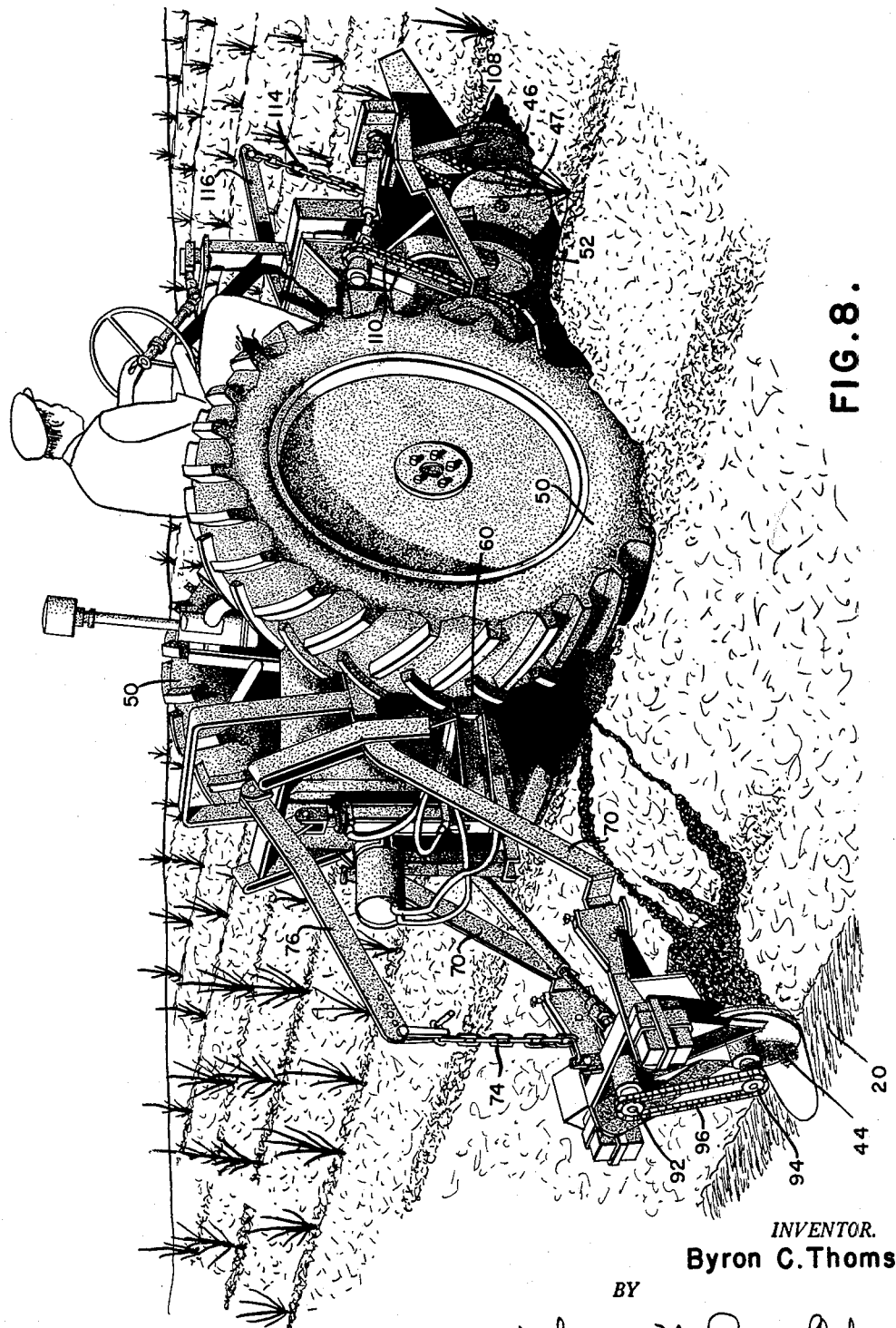

FIGURE 8 shows the machine with the wheels ready to travel over the rough terrain incident to the cutting or cleaning of the drain.

By width of tread is meant the distance from wheel center to wheel center of the two propulsion ground wheels 50 measured laterally across the machine, which width is preferably of the order of thirty-seven inches.

Also due to the rough terrain and the up and down movement in traversing the hills and middles, very low speed of machine is required. This condition involves a large gear reduction ratio, particularly as the permissible speed or the ideal speed at least is something less than one mile per hour. This requires two gear reductions in the first transmission 132 which is a gear reduction unit and in the second transmission 136 which is a combination gear reduction and differential unit. The reduction is also carried into the chain and sprocket gearing 140 and the spur gearing 144, 146.

At times it is necessary for this machine to travel over the road from field to field in which event through the transmission the speed may be stepped up to a permissible approximately twenty-three miles per hour to give one example.

The cutting discs are provided with suitable blades or cutters 45, such for instance as the blades disclosed in the Barras patent.

Referring to FIGURE 11, all discs 46, 48 and 44 are disposed transversely of the machine and in a substantially upright attitude so that they have planes of rotation crosswise of the frame of the machine and in an upright or substantially vertical direction which of course varies as the front and rear cutter assembly frames 64 and 70 tilt up and down about the main frame pivot 68.

Both fore and reverse cutters 46 and 48 rotate in the same direction as it is most convenient to couple the same together and in fact one disc would suffice with blades on the front and rear of the same. Consequently, both cutters 46 and 48 throw the dirt laterally to the same side of the machine as shown by the two arrows in FIGURE 11. However, the after cutter 44 is preferably driven in an opposite rotary direction so that the earth thrown thereby is delivered to the opposite side of the machine as shown by the arrow also in FIGURE 11. The cutting teeth on the rear front disc 48 are in reverse order with respect to the blades 45 on the front disc 46. In going forward the front disc 46 throws earth to the left side (facing the machine) and the reverse front disc 48 does not throw any earth. Going forward, the after disc 44 throws earth to the right side (facing the machine). Backing up, the rear front disc throws earth to the left side (facing the machine); while the other two discs 46 and 44 do not throw any earth.

The drawings show the best form of machine known to applicant at this time for accomplishing the objects of this invention, both the method invention and the mechanical invention. However, quarter drains were originally dug by plow and it is conceivable that a job of sorts could be accomplished with two or three plows with the plows in the relation established by the disclosure of the present application. The Barras patent demonstrated a more satisfactory drain cleaning operation with the rotary type of toothed or bladed disc and such type of cutter has been successfully worked with applicant's novel method and machine.

The significance of throwing the earth to both sides of the machine, as shown by the arrows in FIGURE 11, instead of to one side only is for the purpose of minimizing the amount of earth which builds up in the adjacent middles. The more the earth taken out of the quarter drain is spread the less fill there will be to impede drainage.

When the main frame 60 is down, as shown in FIGURE 14, the rear cutter 44 is purposely set at an angle of 5° forwardly of the perpendicular because this is better for an entry into the earth than if it were straight up. When the main frame is in the up position of FIGURE 13 it does not elevate the rear cutter 44 but only changes the angle of this cutter 3° rearwardly toward the perpendicular from 5° to 2°. This is accomplished through the following actions. When the main frame 60 is elevated, as shown in FIGURE 13, it also elevates extension 66 which includes hinge point 68. As hinge point 68 is also elevated it moves frame 70 rearwardly slightly which tilts the top of cutter 44 rearwardly 3°.

The term "free floating," when applied to the rear cutter means that the flexible chain 74, which lifts this device by means of the hydraulic cylinder 82, is completely free of tension (down) so that said chain does not exert any limiting force upon the rear cutter 44. This condition is not true of the front cutter 46 because the front chain 114, when the machine is going forward, is always kept tight so as to maintain a shallower cutting by this front disc 46 so that the rear disc 44, which immediately follows "free floating" in the same track, completes the quarter drain at the proper depth.

In FIGURES 4 and 5 the front disc 46 is shown held by its chain at a slightly higher level than the rear disc. In this relative arrangement it is easier to let each cutter do part of the work rather than to have one cutter do it all and the other cutter simply trail. Also, there is another reason for this relative arrangement of cutter adjustment as to depth as, when the far ditch is reached, the machine is backed and the reverse cutter 48 is set to deepen the end portion of the drain if it is not as deep as the drain which had been cut by both cutters through the entire cut of cane.

Although I have disclosed herein the best form of the invention known to me at this time, I reserve the right to all such modifications and changes as may come within the scope of the following claims.

What is claimed is:
1. The herein described method comprising
 (a) entering a cane field with a moving machine near a lateral ditch until the quarter drain is reached followed by
 (b) turning across the cane rows in a general direction away from the said lateral ditch with a forwardly extending drain cleaning device on the moving machine extending down into the quarter drain and a rearwardly extending drain cleaning device on the moving machine extending down into the said lateral ditch in line with said quarter drain and
 (c) proceeding across the cane rows and
 (d) lifting the earth from said quarter drain both behind and in front of the moving machine so that the said quarter drain is completed into the next lateral ditch by means of the forwardly extending drain cleaning device.
2. In a method as outlined in claim 1 including
 (e) the further step of deepening the drain already cut into the ditch in front of the apparatus, by
 (f) reversing the machine and cutting the drain deeper while backing up.
3. The process of digging or cleaning out quarter drains in sugar cane growing squares bounded by near and far lateral ditches running substantially parallel with the rows of growing cane and each having a bank adjcent the near row of growing cane and wherein the quarter drains extend from the near lateral ditch to the far lateral ditch to and through both banks crosswise of the cane rows comprising (a) locating an after cutting member in said near ditch outwardly of its bank at quarter drain level and in alignment with the quarter drain to be cleaned, (b) locating a fore cutting member inwardly of the bank of the said near lateral ditch, in line with said after cutting member and at quarter drain level, and (c) moving said cutting members in one continuous cutting operation longitudinally along the line of the quarter drain so that the fore cutting member cuts the quarter drain from its point of origin to and through the bank of the said far lateral ditch and the after cutting member cuts through the bank of the said near lateral ditch and cuts the quarter drain from said bank at least up to the point where the fore cutting member begins to cut the quarter drain so that the quarter drain cut is continuous to and through both near and far ditch banks into the lateral ditches.

4. The process as claimed in claim 3 wherein said cutting members simultaneously operate on the quarter drain at least during a part of the time the cutting members are moved along the line of the quarter drain.

5. The process of digging or cleaning out quarter drains in sugar cane growing squares bounded by lateral ditches running substantially parallel with the rows of growing cane and each having a bank adjacent the near row of growing cane and wherein the quarter drains extend from the bank of one lateral ditch to the bank of the other lateral ditch crosswise of the cane rows comprising (a) locating a mobile frame longitudinally of and over the quarter drain adjacent one of said lateral ditches, (b) positioning a cutting member on the frame outboard of the after end of the frame, over the said one of the lateral ditches outwardly of its bank and in line with the quarter drain, (c) locating a cutting member on the frame outboard of the fore end of the frame and in line with the quarter drain, (d) lowering the after cutting member into the said one lateral ditch to quarter drain level, (e) moving the frame from said one ditch towards said other ditch along the line of the quarter drain so that the after cutting member cuts through said bank of the said one ditch and cuts the quarter drain, and (f) lowering the fore cutting member to quarter drain level before it reaches the said bank of the said other ditch so that it cuts through the bank of the said other ditch and the after and fore cutting members together complete the cutting of the quarter drain to communicate the quarter drain with both lateral ditches.

6. The process of digging or cleaning out quarter drains in a sugar cane field in which sugar cane grows in squares bounded by lateral ditches running substantially parallel with the rows of growing cane and each having a bank adjacent the near row of growing cane and wherein the quarter drains extend from the bank of one lateral ditch to the bank of the other lateral ditch crosswise of the cane rows comprising (a) entering the cane field with a mobile machine between the said bank of said one lateral ditch and its adjacent row of cane until the first quarter drain is reached, said machine having an after cutting member thereon extending rearwardly outboard of said machine and a fore cutting member thereon extending forwardly outboard of the machine, (b) turning the machine across the cane rows to enter the first quarter drain in a general direction away from the said one lateral ditch until the after cutting member is positioned in the said one ditch on the side of said bank remote from said adjacent cane row in line with and at the level of said first quarter drain and the fore cutting member is positioned above and in line with said first quarter drain, (c) proceeding across the cane rows along the line of said first quarter drain in a direction away from the said one ditch towards the said other ditch so that the after cutting member cuts through the said bank of the said one ditch and the fore cutting member cuts through the said bank of said other ditch and the two cutting members together cut the quarter drain to communicate the quarter drain with both ditches, (d) moving the mobile machine parallel to and inwardly of the said bank of the said other ditch until the machine reaches the second quarter drain, and then (e) turning the machine across the cane rows to enter the second quarter drain and repeat the cutting operation through said banks and the second quarter drain.

7. The process of digging or cleaning out quarter drains in a sugar cane field in which sugar grows in squares bounded by lateral ditches running substantially parallel with the rows of growing cane and each having a bank adjacent the near row of growing cane and wherein the quarter drains extend crosswise of the cane rows from one lateral ditch to the other lateral ditch, the cane plants on one side of the quarter drain being spaced from the cane plants on the opposite side of the quarter drain slightly over 37 inches comprising (a) entering the cane field with a mobile machine having a width of the order of 37 inches and a short wheel base of the order of 60 inches to permit short turns and provided with an after cutting member thereon extending rearwardly outboard of said machine and a fore cutting member thereon extending forwardly outboard of the machine, between the said bank of said one lateral ditch and its adjacent row of cane until the first quarter drain is reached, (b) raising the after cutting member to a higher elevation than that of the bank of said one lateral ditch, (c) raising the fore cutting member to a higher elevation than that of the quarter drain to be cleaned, (d) turning the machine across the cane rows to enter the first quarter drain in a general direction away from the said one lateral ditch until the after cutting member is positioned in the said one ditch on the side of said bank remote from said adjacent cane row in line with said first quarter drain and the fore cutting member is positioned above and in line with said first quarter drain, (e) lowering the after cutting member into the said one ditch to the level of said first quarter drain, (f) lowering said fore cutting member into engagement with the soil of the first quarter drain, (g) proceeding across the cane rows along the line of said first quarter drain in a direction away from the said one ditch towards the said other ditch without disturbing the cane plants on either side of the first quarter drain since the machine is of less width than the distance between the plants on opposite sides of the drain so that the after cutting member cuts through the said bank of the said one ditch and the fore cutting member cuts through the said bank of the said other ditch and the two cutting members together cut the quarter drain to communicate the quarter drain with both ditches, the cutting members being disposed substantially perpendicular to the line of travel of machine during the cutting operation, (h) moving the mobile machine parallel to and inwardly of the said bank of the said other ditch until the machine reaches the second quarter drain, and then (i) turning the machine across the cane rows to enter the second quarter drain and repeat the cutting operation through said banks and the second quarter drain, (j) such moving and turning being permitted due to the short wheel base of the machine.

8. A machine for cleaning quarter drains comprising
 (a) main frame ground wheels,
 (b) a main frame having pivotal mounting about the lateral axis of the wheels,
 (c) a front ground steering wheel,
 (d) fore and after cleaner bladed discs,
 (e) fore and after cleaner disc carrying frames pivoted about the forward portion of the main frame for up and down movement, and
 (f) means attached to the forward part of the main frame for pivoting the main frame about said axis to raise and lower the point of pivotal attachment of the after disc frame to alter the pitch of the disc.

9. A machine for cleaning quarter drains in sugar cane growing squares bounded by lateral ditches running substantially parallel with the rows of growing cane and wherein the quarter drains extend from one ditch to another crosswise of the cane rows comprising
 (a) fore and after cleaning members,
 (b) a frame carrying and spacing said members apart with the after member in the rear portion of the frame and the fore member in the front portion of such frame,
 (c) adjusting means for lowering the members in an origin position to desired drain depth with the after member entering the near ditch and the fore member entering the soil in drain line and also for raising the members,
 (d) means for driving the frame in the line of the ditch from the origin position to a final position in which the fore member has passed through the ditch bank into the far ditch whereby to clean the drain from ditch to ditch in one pass of the machine,
 (e) wheels making the frame mobile including at least
 (f) one ground front steering wheel and
 (g) rear propulsion wheels closely spaced back of the front steering wheel,
 (h) the fore member carried forwardly of the wheels to project into the far ditch when the wheels stop short of the far ditch to assure completion of the drain through the ditch bank and into the far ditch,
 (i) the after member carried rearwardly of the wheels to overlie the near ditch when the wheels are in origin position to enable the after member to enter the ditch and register with the base level of the drain prior to bodily movement of the frame, and in which said frame comprises
 (j) a main frame pivoting about the axis of the rear wheels and having relatively vertical sliding movement with respect to the front wheel, and
 (k) fore and after cleaning member frames pivoted to the main frame forwardly of the axis of the rear wheels.

10. A machine for cleaning quarter drains as claimed in claim 11 further comprising
 (i) means for changing the angles of inclination of the discs.

11. A machine for cleaning quarter drains in sugar cane growing squares bounded by lateral ditches running substantially parallel with the rows of growing cane and wherein the quarter drains extend from one ditch to another crosswise of the cane rows comprising
 (a) fore and after cleaning members,
 (b) a frame carrying and spacing said members apart with the after member in the rear portion of the frame and the fore member in the front portion of such frame,
 (c) adjusting means for lowering the members in an origin position to desired drain depth with the after member entering the near ditch and the fore member entering the soil in drain line and also for raising the members,
 (d) means for driving the frame in the line of the ditch from the origin position to a final position in which the fore member has passed through the ditch bank into the far ditch so that the drain is cleaned from ditch to ditch in one pass of the machine,
 (e) a reverse cleaning member carried at the front portion of the frame adapted on reverse movement of the frame to recut the final section of the drain at the same or a lower level, and in which the cleaning members comprise
 (f) rotary discs disposed transversely of the frame,
 (g) cutters on the discs, and
 (h) means for rapidly rotating the discs to cut and throw the soil out of the drains.

References Cited in the file of this patent

UNITED STATES PATENTS

| | | |
|---|---|---|
| 444,871 | Baker | Jan. 20, 1891 |
| 2,269,502 | Wilson | Jan. 13, 1942 |
| 2,615,263 | Barras | Oct. 28, 1952 |
| 2,737,734 | Barras | Mar. 13, 1956 |
| 2,771,958 | Ball | Nov. 27, 1956 |
| 2,946,143 | Beachy et al. | July 26, 1960 |

FOREIGN PATENTS

| | | |
|---|---|---|
| 949,513 | France | Feb. 21, 1949 |
| 137,545 | Australia | June 7, 1950 |
| 140,768 | Australia | Apr. 11, 1951 |
| 891,333 | Germany | Sept. 28, 1953 |
| 1,030,086 | Germany | May 14, 1958 |